United States Patent
Arava et al.

(10) Patent No.: US 11,075,399 B2
(45) Date of Patent: Jul. 27, 2021

(54) IONIC RECEPTORS TO REGULATE THE POLYSULFIDE SHUTTLE IN LITHIUM-SULFUR BATTERIES

(71) Applicant: Wayne State University, Detroit, MI (US)

(72) Inventors: Leela Mohana Reddy Arava, Farmington Hills, MI (US); Ganguli Babu, Detroit, MI (US); Abdulrazzag Sawas, Dearborn, MI (US); Nareshkumar Thangavel, Detroit, MI (US)

(73) Assignee: WAYNE STATE UNIVERSITY, Detroit, MI (US)

(*) Notice: Subject to any disclaimer, the term of this patent is extended or adjusted under 35 U.S.C. 154(b) by 0 days.

(21) Appl. No.: 15/879,822

(22) Filed: Jan. 25, 2018

(65) Prior Publication Data

US 2019/0229365 A1   Jul. 25, 2019
US 2019/0341645 A9   Nov. 7, 2019

Related U.S. Application Data

(60) Provisional application No. 62/450,723, filed on Jan. 26, 2017.

(51) Int. Cl.

| | |
|---|---|
| *H01M 10/052* | (2010.01) |
| *H01M 4/58* | (2010.01) |
| *H01M 50/44* | (2021.01) |
| *H01M 50/411* | (2021.01) |
| *C01B 17/22* | (2006.01) |
| *C01D 15/00* | (2006.01) |

(52) U.S. Cl.
CPC ........ *H01M 10/052* (2013.01); *H01M 4/5815* (2013.01); *H01M 50/411* (2021.01); *H01M 50/44* (2021.01); *C01B 17/22* (2013.01); *C01D 15/00* (2013.01); *C01P 2002/84* (2013.01); *C01P 2004/04* (2013.01); *C01P 2006/40* (2013.01)

(58) Field of Classification Search
CPC .... H01M 10/052; H01M 4/38; H01M 4/5815; H01M 50/411; H01M 50/431; H01M 50/44; H01M 50/449
See application file for complete search history.

(56) References Cited

U.S. PATENT DOCUMENTS

| | | | | |
|---|---|---|---|---|
| 9,780,379 B2 * | 10/2017 | Zhamu | ............... | H01M 12/08 |
| 2007/0178384 A1 * | 8/2007 | Kajita | ............... | H01M 2/1653 429/251 |
| 2015/0084604 A1 * | 3/2015 | Thillaiyan | ............ | H01M 4/628 320/162 |
| 2017/0062830 A1 * | 3/2017 | Bao | ..................... | H01M 4/628 |

FOREIGN PATENT DOCUMENTS

CN    104993083 A  * 10/2015

OTHER PUBLICATIONS

G. Babu, A. Sawas, N. K. Thangavel, L. M. R. Arava. Two-Dimensional Material-Reinforced Separator for Li-Sulfur Battery, J. Phys. Chem. C, 2018, 122, 10765-10772.*

Lei, Tianyu et al., "Multi-Functional Layered WS2 Nanosheets for Enhancing the Performance of Lithium-Sulfur Batteries," Advanced Energy Materials, 2017, 7, 1601843, pp. 1-8.

Zhang, Qianfan et al., "Understanding the Anchoring Effect of Two-Dimensional Layered Materials for Lithium-Sulfur Batteries," Nano Letters, 2015, 15, American Chemical Society Publications, pp. 3780-3786, and Supporting Information pp. 1-6.

Manthiram, Arumugam, Materials Challenges and Opportunities of Lithium Ion Batteries, The Journal of Physical Chemistry Letters, 2011, 2, American Chemical Society, pp. 176-184.

* cited by examiner

*Primary Examiner* — Carlos Barcena (74) *Attorney, Agent, or Firm* — Fishman Stewart PLLC (57) ABSTRACT

A battery including at least one of a separator, an interlayer, a protective layer, and an electrode that incorporates an ionic receptor nanomaterial of formula $M_xN_y$, wherein M is boron (B), silicon (Si), aluminum (Al), carbon (C) or tin (Sn) and N is nitrogen, with x being equal to 1 to 3 and y being equal to 1 to 4. The ionic receptor nanomaterial is in a form of one of nanoparticles, nanoflakes, nanosheets, nanotubes, or nanorods.

18 Claims, 6 Drawing Sheets

FIG. 5B ly, $M_xN_y$ may be boron nitride.
IONIC RECEPTORS TO REGULATE THE POLYSULFIDE SHUTTLE IN LITHIUM-SULFUR BATTERIES

BACKGROUND

The present disclosure relates to power storage and battery devices. More particularly, the present disclosure relates to materials capable of utilizing lithium/sulfur chemistries for use in such power storage and battery devices.

Li-ion batteries (LIBs) are used as power sources in portable electronics and now are being considered to meet other applications, from electric vehicles, to space shuttles, to mitigating global warming issues. However, the capability of energy storage is still a concern due to limited room for developments in conventional electrode materials.

Beyond the limitations of Li-ion batteries towards efficient energy storage, lithium-sulfur (Li—S) systems are promising in the areas of high-energy density, safety, low cost, and long cycle life for electric-based transportation. This is mainly attributed to the high theoretical capacity, wide range of temperature operation, and the low cost and eco-friendliness of sulfur-based cathodes. However, practical applications of Li—S batteries are still hindered due to short cycle life, poor coulombic efficiency, poisoning of the Li-anode, and self-discharge. These performance limitations generally originate from the insulating nature of sulfur, the shuttling effect of dissolved lithium polysulfide (LiPS) species, and their parasitic reactions with the highly reactive negative electrode. Dissolved LiPS diffuses into the separator as electrostatic attraction proceeds between charged polysulfide species and metallic lithium. Further loss of electroactive species continues while cycling, owing to chemical potential difference, and a concentration gradient can lead to mass transport in the electrolyte.

Though work has been done on cathode frameworks by constructing mesoporous carbon-sulfur composites towards realizing specific capacity, cycle life in the long run still falls short in practical applications due to dissolution of LiPS from cathode. Poor adsorption (only or mostly van der Waals) of polysulfides and the sulfiphobic nature of carbon surfaces drives this phenomenon.

Progressively, polysulfide ($S_n^{2-}$) species pass through the separator, causing undesired mass transport of electroactive species and spontaneous reduction of $S_n^{2-}$ at the anode surface, which eventually results in poisoning of the lithium electrode. In this regard, various materials and additives having polarity and capable of interacting strongly with dissolved polysulfides effectively have been studied, including polymers, metal oxides, and metal sulfides.

It has been a challenge to construct electrode structures with improved pore volume and polarity to enhance battery performance, and to increase coulombic efficiency, rate capability, and progressive cycling limits for practical applications.

BRIEF SUMMARY OF THE INVENTION

In one aspect, the present disclosure provides a separator for a battery. The separator may include, or be coated with, or be decorated by inorganic $M_xN_y$, in which M may be selected from among boron, silicon, phosphorous, aluminum, carbon, and tin, among others, and N represents nitrogen. In some embodiments, $M_xN_y$ may be boron nitride. The boron nitride may be provided as nanosheets. Similarly, organic moieties such as amides and their derivatives of formula R'—CONR; thioamides and their derivatives of formula R—CS—NR—NR'R"; and imidazolium and its derivatives of formula $C_3$—$X_5$—$N_2$ may be employed as anion receptors, wherein in the preceding formulas, R, R', R" may include hydrogen and linear or branched alkyl groups of 1 to about 30 carbons, or any number in between, and the R/R'/R" groups of a molecule may be the same as, or different from, one another. The battery may be a lithium-sulfur, or a lithium ion-sulfur battery.

In another aspect, the present disclosure provides a battery including ionic receptors to regulate polysulfide shuttling, inorganic $M_xN_y$ compounds and organic amides as a part of cathode (electrode), as interlayer between cathode and separator, and ionic receptors contained layer on anode (protective layer). The battery may be a lithium-sulfur, or a lithium ion-sulfur battery.

DETAILED DESCRIPTION OF THE DRAWINGS AND THE PRESENTLY PREFERRED EMBODIMENTS

As used herein with regard to a range, the term "between" is inclusive of the endpoints of said range, unless it is clear that the endpoints are excluded. For example, when "an integer between 1 and 3" is recited, the integer may have a value of 1, or of 2, or of 3.

As used herein, the terms "substantially" and "about" mean "approximately but not necessarily equal to," and when used in the context of a numerical value or range set forth means a variation of ±20%, or less, of the numerical value. For example, a value differing by ±20%, ±15%, ±10%, or ±5%, or any value in the range between −20% and +20%, would satisfy the definition of "substantially" or "about."

Conventional polymer based separators and electrodes are not ideal for preventing LiPS migration towards negative electrode which in turn shorten the battery performance and cycle life. Further, in a rechargeable Li-battery, lithium dendrite formation, mossy metal deposits and ipenetration through the separator (causing an internal short circuit) during the charge/discharge process may be risks.

Towards this direction, a modified separator or interlayer between the sulfur cathode and separator to localize dissolved polysulfides at cathode surface is described herein.

Several materials have been utilized, from simple carbon paper, to modified graphene structures with tuning of their conductivity, porosity and functional groups. Other candidate materials include mesoporous carbon-sulfur, graphene-sulfur, and carbon nanotubes-sulfur composites. However, these structures use involved process in fabrication as free standing films, and lithium deposition in the separator pores pose challenges. Moreover, side reactions of highly active polysulfides and their radical anions with functional groups of conductive carbons and polymers may lead to performance degradation of the cell.

Therefore, separator or electrode modification with non-conductive materials (including certain polymers) that have strong dipoles (high dipole moment anion/cation receptors) to inhibit polysulfides to travel towards anode by adsorbing strongly may be more suited to such an application. In other aspects, a coating layer which may include polysulfide receptors on a metallic lithium or a silicon anode, may result in a way to regulate polysulfide shuttling, thereby improving electrochemical performance.

Herein, ionic receptor-based battery components including electrodes, separators, interlayers, and protective layers are disclosed. These components effectively bind ionic species involved in the system (including polysulfides) via Lewis acid-base interactions may be employed for long cycling and high energy density Li—S batteries.

A separator according to one embodiment of the present disclosure may include, or consist of, one or more chemical compounds having a formula of $M_xN_y$. M may be selected from among boron, silicon, phosphorous, aluminum, carbon, and tin, among others. N represents nitrogen. x may have a value of between 1 and 3. y may have a value of between 1 and 4.

The chemical compound of the separator may be an inorganic anion or cation receptor. It may be provided to the separator either in bulk, or as micron-sized particles, or as nanoparticles, or two-dimensional nanosheets, or nanorods, or in a structure having a porous form, or any combination thereof. The chemical compound may instead be an organic compound or organic moiety, such as an amide, (R'—CONK), a thioamide (R—CS—NR—NR'R"), an imidazolium (C3-R5-N2) anion receptor, wherein each of R, R', and R" includes linear or branched alkyl groups of 1 to about 30 carbons, or any number in between. The R groups are independently selected from one another, such that R, R', and R" may be the same or different alkyl structures for one another. The separator may also or instead include any of calixarene, crown ethers, and cryptand-based cation receptors.

Another separator configuration may include, for example, the above-mentioned anion or cation receptors in a part of an electrode, or an interlayer, or a protective layer on the anode. Such a configuration with, ionic receptor-based membranes and electrodes, may demonstrate a three-fold improvement in higher energy density, with stability over hundreds of cycles, and improved safety features in terms of avoiding internal short circuits.

As an example of an ionic receptor, boron nitride (BN) nanosheets may be used in a separator. Such nanosheets exhibit favorable properties, acting in the separator like an insulator, chemically and electrochemically stable. Such a material may be composed of mixed $sp^2$ hybridized Lewis acid (boron atoms) and Lewis base (nitrogen atoms), leading to facile bonding with polysulfide species. Boron atoms in the BN have a high tendency to accept anion molecules ($S_n^{2-}$) and the lone pair of electrons on nitrogen is capable of attracting the positive end of polysulfide species (for example, lithium). Together, this leads to effective complex formation under electric field to minimize the diffusion of soluble polysulfides across the separator membrane.

Presently, Li—S batteries are being researched, as these are limited for meeting present and future demands, in part due to polysulfides shuttling which may reduce cycle life. Herein, we propose a new approach of using ionic receptors with dipoles in the separator or interlayer to inhibit polysulfides from reaching metallic lithium and mass transport from the cathode. A comprehensive analysis of the ionic receptors on the physical, chemical, and electrochemical properties in Li—S chemistry has been performed. Two-compartment H-cells, coupled with spectroscopic studies such as UV absorption and FTIR are used to demonstrate the effectiveness of the ionic receptors' interactions with polysulfide species. Further, excellent specific capacity (1210 mAh/g) and good cycle life (320 cycles), including a self-discharge study, provide evidence for the feasibility of the modified separator with ionic receptors for commercial applications.

Example 1: Fabrication of BN Nanosheets-Modified Separator

Commercial boron nitride (Sigma Aldrich) having 2-micron particle size was subjected to liquid phase exfoliation by an ultra-sonication method in aqueous medium. Here, sodium cholate hydrate was used as a surfactant material in a ratio of 1 part boron nitride to 5 parts sodium cholate, and sonicated for about 24 hours (hr) with 10 min. rest time after every 2 hr of sonication in order to avoid an excessive increase in temperature of the solution. Then, the homogenous dispersion obtained was centrifuged at 2000 rpm for about 90 minutes (repeated 2 times) in a separation step to segregate the exfoliated BN nanosheets from the bulk samples. Finally, supernatant liquid was drawn off from the residue in the centrifuged tube in a decanting step and used for further experiments. Afterwards, exfoliated BN nanosheets contained in solution may be filtered through a conventional polymer separator (such as a CELGARD® membrane) and dried for 12 hr at about 120° C. under vacuum. In one embodiment, the separator may be a trilayer polypropylene-polyethylene-polypropylene membrane, but other membranes as are known in the art may be substituted in this protocol. The uniformly deposited BN nanosheets may be calculated per area of polymer film by adjusting the concentration of BN nanosheets in solution. Such modified films with different amounts of BN nanosheets were used as separators in the example of the present disclosure in comparison with bare polymer film.

Example 2: Preparation of Lithium Polysulfides ($Li_2S_4$ and $Li_2S_8$)

In the present study, an active material of sulfur is used in the form of catholyte solutions with general lithium polysulfides formula of $Li_2S_8$ and $Li_2S_4$ in tetra ethylene glycol dimethyl ether (TEGDME). This solution may be prepared, for example, from stoichiometric amounts of $Li_2S$ and S to form desired LiPS in TEGDME while stirring at about 90° C. for about 12 hr. The catholyte solution ($Li_2S_8$) used for the electrochemical studies desired herein is 10 μl of 600 mM per cell which corresponds to 1.61 mg of sulfur per $cm^2$ of electrode.

Example 3: Cell Fabrication

Standard 2032 coin cells were used to examine the electrochemical performance of ionic receptor modified separator in conventional Li-polysulfides battery configuration. Gas diffusion layer (GDL) paper has been used as positive electrode cut into circular discs of 12.7 mm diameter. An active material containing catholyte ($Li_2S_8$) with the molar concentration of 600 mM was used along with an electrolyte including, or consisting of, 1M of lithium bis(trifluoromethanesulfonyl) imide (LiTFSI) and 0.5M of lithium nitrate ($LiNO_3$) in TEGDME.

Pertaining to the polymer (separator) membrane, it may include or consist of polyethylene oxide (PEO) and polypropylene. The polymer may also be selected from at least one of polyethylene, polypropylene, polyvinylidene fluoride, and polyacrylic acid. The preceding polymers may be combined with a compound of formula $M_xN_y$, as described herein. The battery may include an organic, liquid-based electrolyte. The Li-S battery may have a carbon-sulfur or carbon-liquid polysulfide as cathode, and metallic lithium as anode. These constructions provide improved results over electrode materials with limited specific capacities, such as graphite and $LiMO_2$, and will assist in increasing the current limitations of presently available lithium ion batteries (typically 150-200 Wh/kg) due to its high theoretical energy density (of about 2567 Wh/kg). The energy density of a battery in accordance with this invention may be at least 250 Wh/kg, or at least about 300 Wh/kg, or at least about 400 Wh/kg, or at least about 500 Wh/kg, or at least about 750 Wh/kg, or at least about 1000 Wh/kg, or at least about 1500 Wh/kg, or at least about 2000 Wh/kg.

Results and Discussion

Figure 1A:
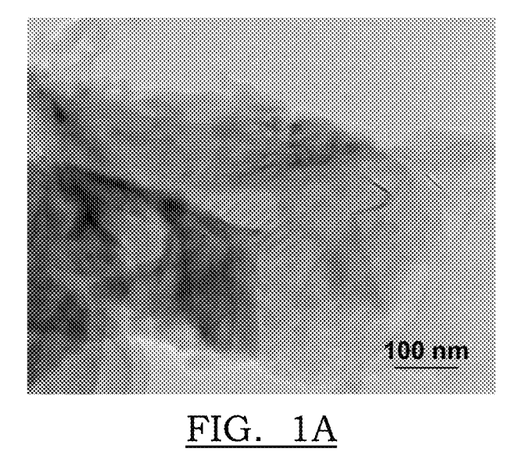
FIG. 1A is a transmission electron micrograph of exfoliated BN nanosheets in accordance with one embodiment of the present disclosure.

Boron nitride nanosheets have been obtained by liquid phase exfoliation using sonication to produce large-scale nanosheets of 2D materials. In a controlled experiment, energies from sound waves, such as ultrasound energies of about 50-60 hertz, are effective to overcome the weak forces of attraction between the interlayer of hexagonal crystalline boron nitride (h-BN) to produce nanosheets. Surfactant has been used to disintegrate and stabilize exfoliated nanosheets in liquid medium, and the ratio of BN and surfactant are selected as it may define the quality of nanosheets. Exfoliated BN nanosheets may be collected through repeated centrifugation, which separate out the nanosheets of h-BN from the un-exfoliated counterpart. Such nanosheets-containing solution may be washed thoroughly to remove surfactant and vacuum dried overnight, and subsequently subjected to microscopy studies as shown in FIG. 1a.

Figure 1B:
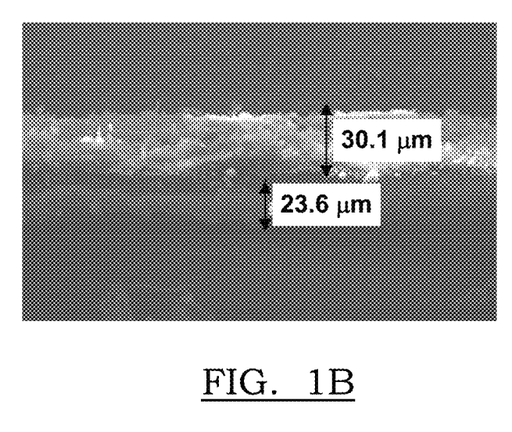
FIG. 1B is a cross sectional view of BN modified separator by field emission scanning electron microscopy (FE-SEM)

Further, a modified separator may be prepared using the CELGARD® membrane decorated or coated with BN nanosheets via a filtration process wherein the CELGARD® membrane acts as filter membrane for the solution BN-containing nanosheets. Prior to use as separator for the construction of Li-S cell, a modified separator may be dried under vacuum at 100° C. and tested for its robustness as displayed in FIG. 1b. Transmission electron microscopy (TEM) images reveal disintegration and presence of BN nanosheets represent a successful exfoliation in aqueous solution. Such exfoliated nanoflakes have been observed along with extensive wrinkling of the edges, as expected from sonication energy generated by sound waves. BN exfoliation resulted in planar objects with small lateral size below 100 nm, which is suitable to decorate polymer membranes with strong physical adsorption. In this embodiment the polymer membrane is covered substantially completely with BN nanosheets with a thickness of about 100 nanometers (nm) to about 30 microns (μm), or about 250 nm to about 29 μm, or about 400 nm to about 28 μm, or about 650 nm to about 27.5 μm, or about 800 nm to about 27 μm, or about 1 μm to about 26.75 μm, or about 2.5 μm to about 26.5 μm, or about 5 μm to about 26.25 μm, or about 10 μm to about 26 μm, or about 15 μm to about 25.5 μm, or about 20 μm to about 25 μm (FIG. 1b).

Electrochemical compatibility of a BN nanosheets-modified separator, and its unmodified counterpart, has been evaluated by assembling standard 2032 coin cells. The cells include a gas diffusion layer on carbon paper as working electrodes vs. metallic lithium foil as a counter/reference electrode and CELGARD® membrane or modified CELGARD® membrane with BN nanosheets as a separator. The active species may be in the form of LiPS (0.6M of $Li_2S_8$) in TEGDME solution, containing 1M of lithium bis(trifluoromethanesulfonyl) imide (LiTFSI) and 0.1M lithium nitrate ($LiNO_3$). Electrochemical properties with and without BN nanosheets were measured using 10 μl of $Li_2S_8$ (1.52 mg/cm$^2$) at a constant current rate of 0.2C in a potential window between 3.0-1.5 V. The quantity of BN per cm$^2$ of polymer membrane yields effective adsorption of LiPS by conducting systematic electrochemical experiments in Li-polysulfides cell configuration.

FIG. 2 shows galvanostatic discharge-charge profiles and cycling performance of LiPS in presence of the separator, modified with different concentrations of BN nanosheets. For all the studied concentrations, voltage vs. capacity plateaus corresponding to LiPS red-ox reactions are observed, and their reversibility with cycling is a first indication of separator behavior without short circuit of the cell (FIG. 2a-c). Well defined plateaus related to the reduction of long-chain LiPS ($Li_2S_x$, in which x is between 6 and 8, inclusive) at 2.4 V and then followed by further conversion to short-chain LiPS ($Li_2S_2$ and $Li_2S$) at 1.92 V. Although an ultra-low concentration of BN nanosheets on polymer membrane may not be effective to adsorb all the dissolution polysulfide species, on the other hand, an excess concentration of BN with their insulated nature may result in increased resistance of the cell. Therefore, an appropriate concentration and thickness of BN nanosheets will be used to obtain desirable features of polysulfides adsorption and hence avoid polysulfides reaching metallic lithium anode. On careful observation of polarization (difference between discharge and charge plateau potential), it is concluded that the BN concentration of about 0.01 mg/cm$^2$ to about 10 mg/cm$^2$, or about 0.05 mg/cm$^2$ to about 7.5 mg/cm$^2$, or about 0.1 mg/cm$^2$ to about 5 mg/cm$^2$, or about 0.25 mg/cm$^2$ to about 2.5 mg/cm$^2$, or about 0.5 mg/cm$^2$ to about 2 mg/cm$^2$ to, or about 0.75 mg/cm$^2$ to about 1.5 mg/cm$^2$ to, or about 1 mg/cm$^2$, or any quantity between 0.01 mg/cm$^2$ and about 10 mg/cm$^2$, inclusive, is desirable with minimal polarization even after 70 cycles. Such a behavior is an indication of the suitability of the newly identified separator for long cycling of a Li—S battery.

Figure 2A:
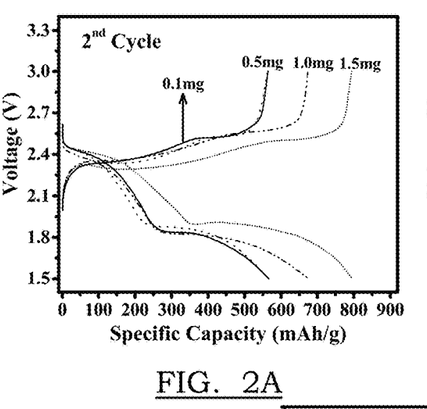
FIGS. 2A-2D are galvanostatic discharge/charge profiles of Li—S in various BN concentration modified separators, and corresponding cycle life studies.
Figure 2B:
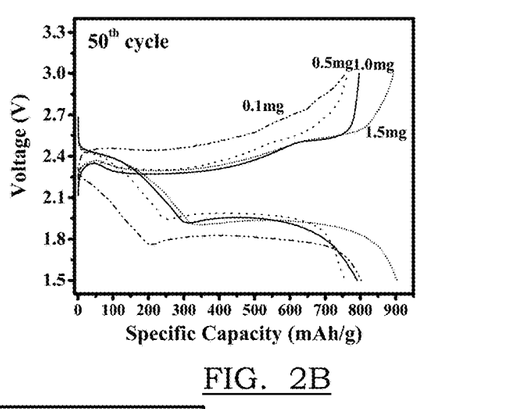
Figure 2C:
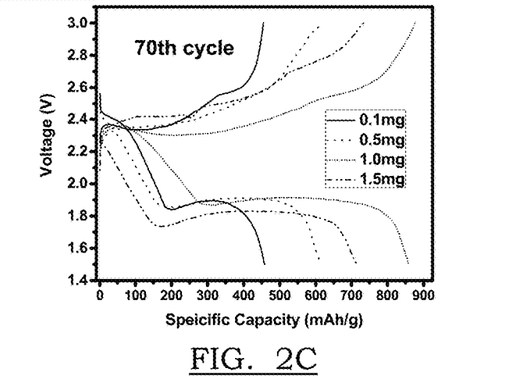
Figure 2D:
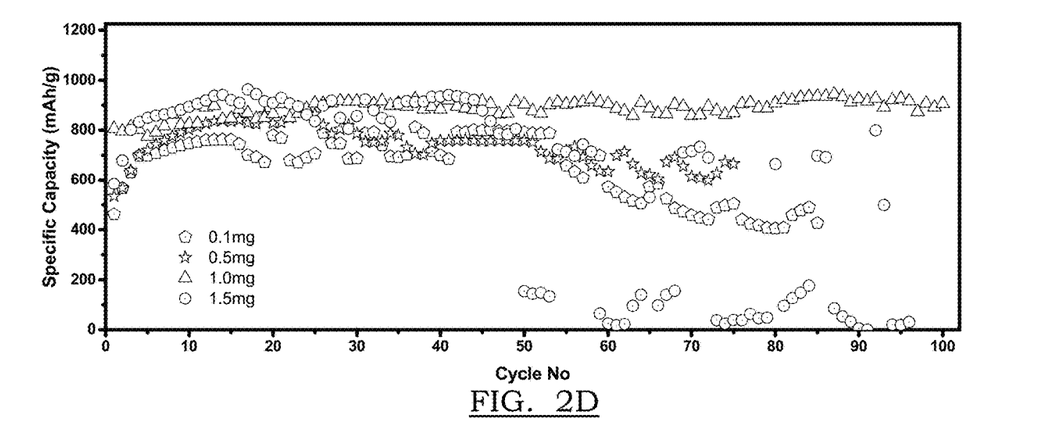

Further, the cycling behavior of Li-polysulfide cells with various concentrations of BN nanosheets on a polymer membrane as a separator has been displayed in FIG. 2d. Though discharge capacity values are comparable for initial cycles, progressive cycles reveal distinguishable behavior with respect to concentration of nanosheets. Owing to the concentration of in one embodiment about 1 mg of BN nanosheets, the nanosheets are effective to adsorb and inhibit the passage of short-chain lithium polysulfides through them to the anode. Hence, BN nanosheets are demonstrated as efficient ionic receptors towards LiPS adoption, remaining intact with the cathode matrix to provide long cycling and high specific capacity of 800 mAh g$^{-1}$ (FIG. 2d). Based on stable results obtained from a cell containing about 1 mg of BN nanosheets, subsequent studies are carried out with same configuration.

Figure 3A:
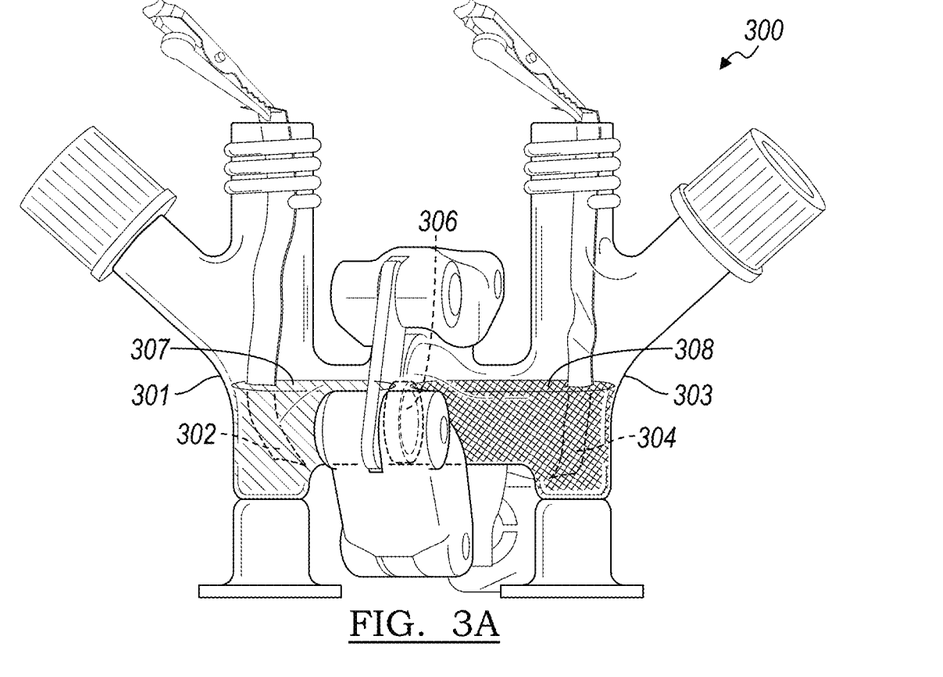
FIG. 3A is a perspective view of a cell containing a commercial separator.
Figure 3B:
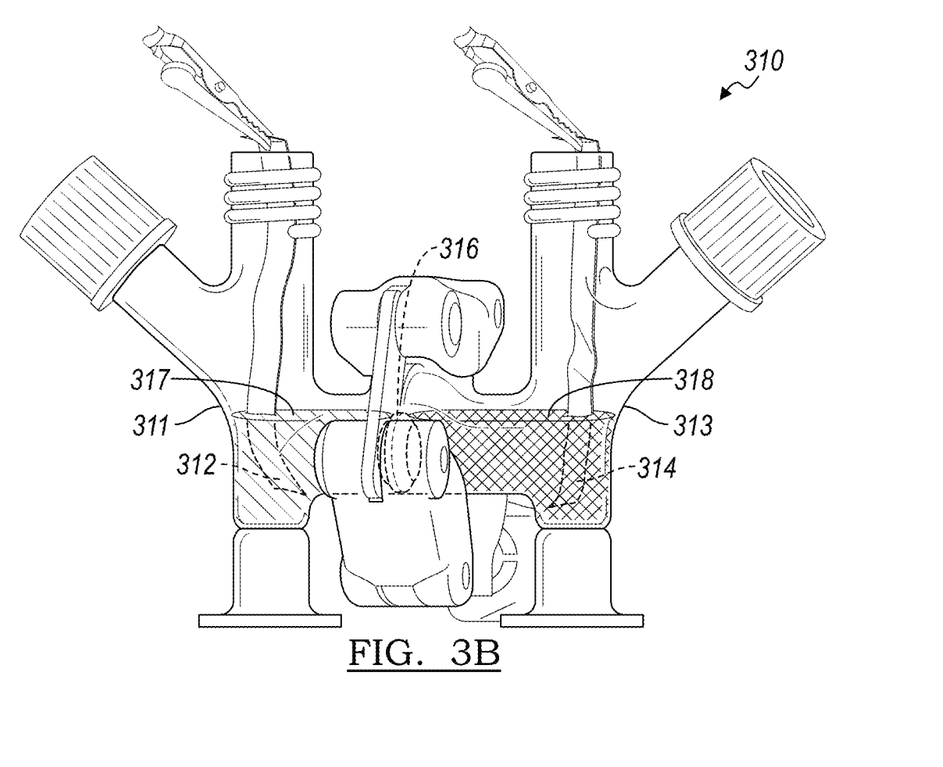
FIG. 3B is a perspective view of a cell containing a modified, BN-coated separator in accordance with the principles of the present disclosure.
Figure 3C:
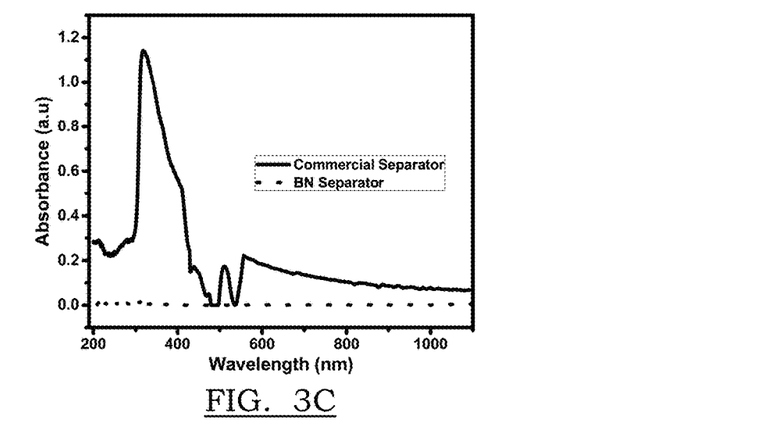
FIG. 3C is a UV-visible absorbance study of LIPS.

The adsorption of LiPS on BN nanosheets may be evaluated using visual inspection and ultra-violet absorption studies. A transparent two-compartment H-cell has been used to visualize the effect of a BN-modified separator to stop polysulfides from reaching the anode compartment as shown in FIG. 3A. The H-cell 300 of FIG. 3A is constructed using sulfur impregnated carbon paper, which acts as the working electrode 304, and metallic lithium as the counter and reference electrode 302. The cell 300 uses a commercial separator 306. During discharge, liberated Li-ions at the anode travel through the separator to react with sulfur at the cathode 303, to form (and to detach the soluble form) of LiPS out of the cathode matrix. In the case of the conventional separator 306, these intermediate polysulfides may tend to pass through to reach the metallic lithium anode (FIG. 3A; note darker fluid 308 in anode compartment 303), wherein parasitic reactions may occur and eventually poison the surface for subsequent electrochemical reactions. Such crossover polysulfide species were detected by UV absorption study as it exhibits a strong absorption peak at 380 nm as shown in FIG. 3C. On the other hand, BN nanosheets modified separator 316 in H-cell 310 of similar construction is effective to block polysulfides by adsorbing them as evident from the color free fluid 314 in the anode compartment 313 even at deep discharge (FIG. 3C). Hence, the lithium anode 314 has a surface generally free from polysulfide poisoning and may therefore provide longer cycling with the modified separator 316.

Figure 4A:
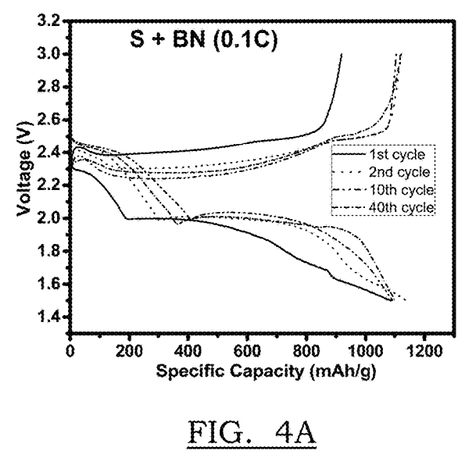
FIG. 4A-4C are galvanostatic discharge/charge profiles of sulfur with commercial and with BN coated separator, and their corresponding life cycle studies.
Figure 4B:
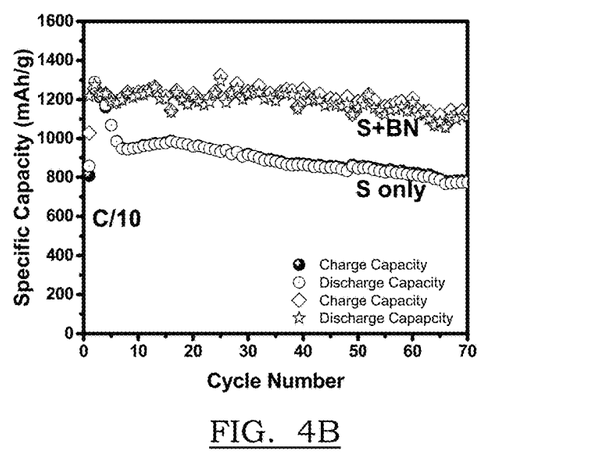

FIG. 4 shows galvanostatic discharge-charge profiles and cycling performance of an exfoliated BN modified separator in comparison to a conventional polymer separator. Cycling behavior of the modified separator for 100 cycles at 0.1° C. rate reveals as high as specific capacity of 1210 mAh/g with excellent coulombic efficiency of ~99.1% (FIG. 4a). Though capacity values are similar for initial cycles, drastic changes are observed as the cycling process progresses. For instance, from 10 to 100 cycles, capacity fading is minimal with the modified separator, whereas gradual fade is observed with the conventional separator. At the end of 100th cycle, the cell with modified separator delivers the capacity of 1121 mAh $g^{-1}$ and the cell with conventional separator displays low capacity of 778 mAh/g due to irreversible mass transport from the cathode. In contrast, the cell of the present disclosure has a capacity of between 800 mAh/g and 1200 mAh/g. At 0.2° C. rate, distinct voltage vs. capacity plateaus have been observed due to well-defined LiPS red-ox reactions upon the number of cycles (FIG. 4b). Such plateaus may be attributed to the conversion of long-chain LiPS to medium ($Li_2S_x$, wherein x is between 6 and 8, inclusive) at 2.4 V, and subsequent conversion to short-chain LiPS at 2.0 V.

Figure 4C:
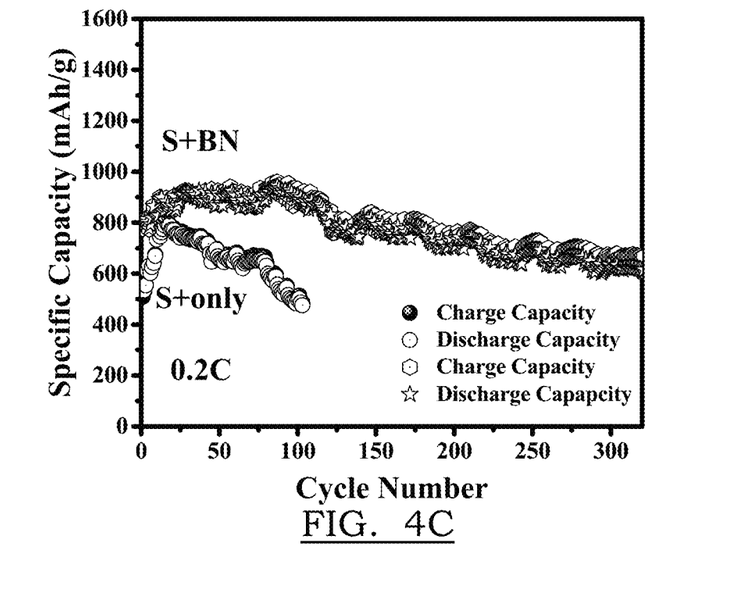

Stability in polarization, even after several cycles, confirms the suitability of BN nanosheets-modified separators for use in longer cycling for Li-polysulfide batteries. Furthermore, owing to their large surface areas and polarity, exfoliated BN nanosheets are effective to control polysulfide shuttling to enhance cycle life as demonstrated in FIG. 4c. A Li-polysulfide cell with a modified separator exhibits a stable specific capacity about 810 mAh/g (FIG. 4c) with about 83% of capacity retention for about 320 cycles.

Figure 5A:
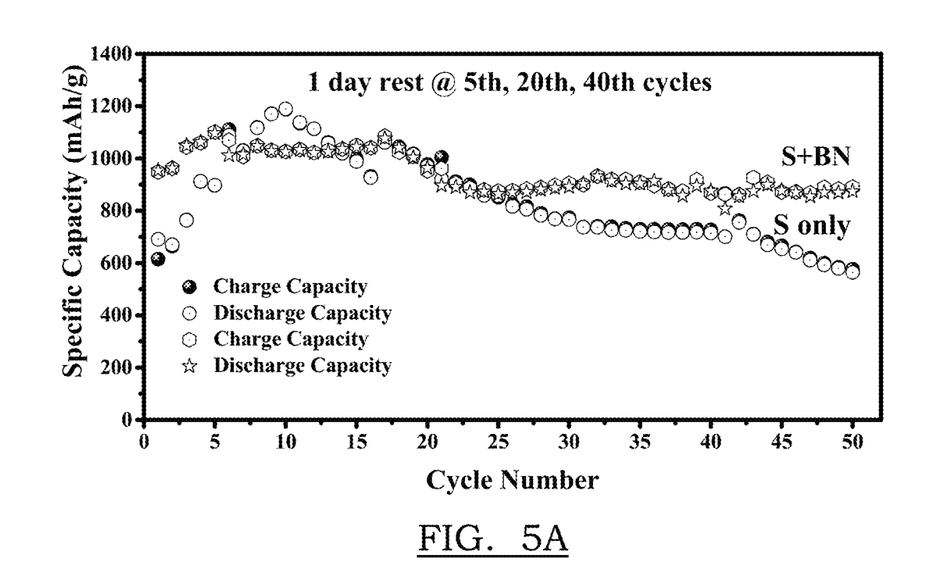
FIG. 5A-5B are self-discharge studies of discharge-charge profiles of sulfur with a commercial and with a BN coated separator.
Figure 5B:
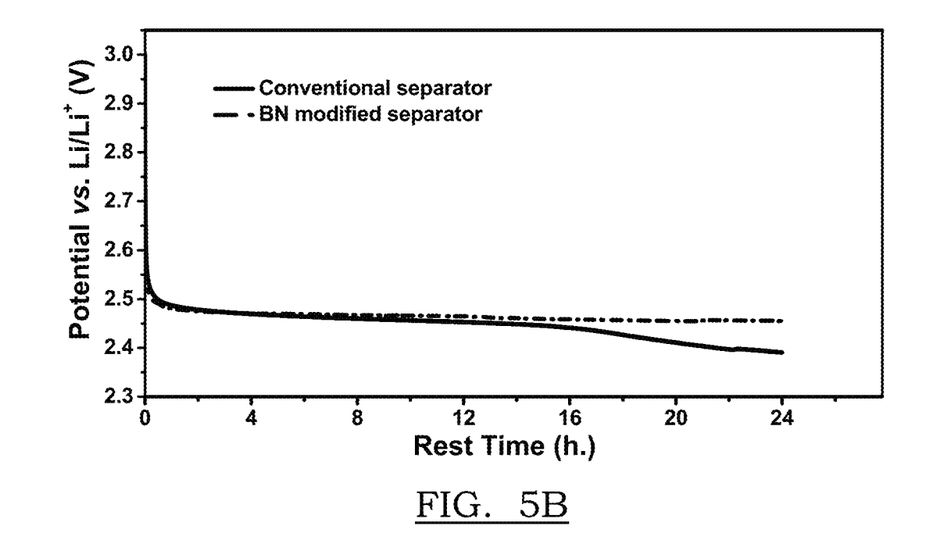

Self-discharge deteriorates a battery with age and cycling. Li—S chemistry is likely to increase self-discharge, as negatively charged intermediate species tend to escape from the cathode due to electrostatic attraction forces from metallic lithium. To understand the effect of the modified separator, especially with cycling, cells have been subjected to self-discharge studies in between cycles at the 2nd, 20th and 40th cycles, as shown in FIG. 5a. It is seen that capacity fades significantly with intermediate self-discharges for a cell having a conventional separator, whereas stable performance is observed with a cell containing a modified separator. FIG. 5b provides evidence of self-discharge in the conventional separator, as it decays after 12 hr. On the other hand, modified separator contained cell exhibits a stable voltage at 2.49 V without self-discharging for 24 hr, possibly due to controlled polysulfide shuttling due to the polar nature of BN nanosheets.

The present disclosure provides an improvement in electrochemical performance using a BN nanosheets-modified separator. The high surface area and polar nature allows for strong adsorption of polysulfides without crossover to reach metallic lithium. Visual observation with a two-compartment H-cell and spectroscopic studies reveal the interactions between BN nanosheets and polysulfide species under electrochemical cycling. From the detailed electrochemical studies, high specific capacity of 1210 mAh $g^{-1}$ at 0.1C rate with excellent capacity retention over the illustrated number of cycles has been realized (see FIG. 5b). The rate of self-discharge is almost negligible (less than about 1%) for a fully charged cell with a modified separator at 24 hrs, while a conventional separator-based cell may exhibit high self-discharge of greater than about 4%. Li—S cells are improved by stabilizing polysulfide shuttles and protecting metallic lithium from polysulfide poisoning. A compatible and robust separator to stop polysulfides and keep a cathode matrix intact leads to long cycling with minimal self-discharge.

Numerous possible uses for such a battery separator, or battery, exist, including in portable electronics, battery-operated mobile tools, and in hybrid electric vehicles. The separator and battery technology has a high theoretical energy density, safety, wide temperature range in which it may operate, low cost, and good environmental friendliness. The limitations of conventional Li—S batteries (short cycle life, lower coulombic efficiency, self-discharge, and poisoning of the Li-anode) are overcome by the aspects of the present disclosure because of avoiding of the insulating nature of sulfur and minimizing the shuttling effect of dissolved lithium polysulfide species and their reactions with the reactive negative electrode, which in turn shortens battery performance and cycle life.

The invention claimed is:

1. A battery comprising:
    at least one component selected from the group consisting of a separator, an interlayer, a protective layer, and an electrode, the at least one component comprising an ionic receptor nanomaterial of formula $M_xN_y$, wherein M is selected from the group consisting of B, Si, P, Al, C, and Sn, N represents nitrogen, and wherein x=1 to 3, and y=1 to 4;
    wherein the ionic receptor nanomaterial of formula $M_xN_y$ consists of a form of exfoliated nanoflakes; and
    wherein M is boron, x=1 and y=1, the boron nitride is provided in a concentration of about 0.01 mg/cm² to about 10 mg/cm².

2. The battery of claim 1, wherein the ionic receptor nanomaterial of formula $M_xN_y$ is combined with at least one polymer selected from the group consisting of polyethylene, polypropylene, polyvinylidene fluoride, and polyacrylic acid.

3. The battery of claim 1, wherein the ionic receptor nanomaterial of formula $M_xN_y$ is part of one of a mesoporous carbon-sulfur composite, a graphene-sulfur composite, and a carbon nanotubes-sulfur composite.

4. The battery of claim 1, wherein the ionic receptor nanomaterial of formula $M_xN_y$ is incorporated into at least one of the separator and the electrode.

5. The battery of claim 1, wherein the battery is one of a lithium-sulfur, a lithium-polysulfide, a Li-ion polysulfide, and a lithium ion-sulfur battery.

6. The battery of claim 1, wherein the boron nitride is provided as nanosheets.

7. The battery of claim 6, wherein the nanosheets cover the component, such that the nanosheets have a combined thickness between about 100 nanometers and about 30 microns.

8. The battery of claim 6, wherein the nanosheets are physically adsorbed onto the component.

9. The battery of claim 1, having a capacity of between about 800 mAh/g and about 1200 mAh/g.

10. The battery of claim 1, wherein at least one of the separator, the electrode, the interlayer, and the protective layer further comprises at least one organic ionic receptor selected from an amide (—CONR), a thioamide (R—CS—NR'—NR'R"), and an imidazolium anion receptor, wherein R, R', and R" are each independently linear or branched alkyl groups of 1 to 30 carbons.

11. The battery of claim 1, wherein the concentration is about 0.05 mg/cm$^2$ to about 7.5 mg/cm$^2$.

12. The battery of claim 11, wherein the concentration is about 0.1 mg/cm$^2$ to about 5 mg/cm$^2$.

13. The battery of claim 12, wherein the concentration is about 0.25 mg/cm$^2$ to about 2.5 mg/cm$^2$.

14. A battery comprising:
   a separator with boron nitride physically adsorbed thereon consisting of a form of exfoliated nanoflakes, the battery being one of a lithium-sulfur, a lithium-polysulfide, a Li-ion polysulfide, and a lithium ion-sulfur battery and having a capacity of between about 800 mAh/g and about 1200 mAh/g;
   wherein the boron nitride is provided in a concentration of about 0.01 mg/cm$^2$ to about 10 mg/cm$^2$.

15. A battery component comprising an ionic receptor nanomaterial of formula $M_xN_y$, wherein M is selected from the group consisting of B, Si, P, Al, C, and Sn, N represents nitrogen, and wherein x=1 to 3, and y=1 to 4;
   wherein the ionic receptor nanomaterial of $M_xN_y$ consists of a form of exfoliated nanoflakes or exfoliated nanosheets; and
   wherein M is boron, x=1 and y=1, the boron nitride is provided in a concentration of about 0.01 mg/cm$^2$ to about 10 mg/cm$^2$;
   wherein the battery component is an interlayer between an electrode and a separator; and
   wherein the battery component is an electrode that further comprises at least one organic receptor; the organic ionic receptor being functionalized on at least one of mesoporous carbon, graphene, or carbon nanotubes for sulfur composites.

16. The battery component of claim 15, wherein the battery component further comprises at least one organic ionic receptor; the organic ionic receptor being part of a polymer selected from at least one of polyethylene, polypropylene, polyvinylidene fluoride, and polyacrylic acid.

17. The battery component of claim 15, wherein the battery is one of a lithium-sulfur, a lithium-polysulfide, a Li-ion polysulfide, and a lithium ion-sulfur battery.

18. The battery component of claim 15, wherein the boron nitride is provided as nanosheets.

\* \* \* \* \*